US008761983B2

(12) United States Patent
Nonaka et al.

(10) Patent No.: US 8,761,983 B2
(45) Date of Patent: Jun. 24, 2014

(54) POWER LINE COMMUNICATION SYSTEM AND VEHICLE

(75) Inventors: Tomonori Nonaka, Kanagawa (JP); Norihiko Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/822,846

(22) PCT Filed: Sep. 30, 2011

(86) PCT No.: PCT/JP2011/005540
§ 371 (c)(1),
(2), (4) Date: Mar. 13, 2013

(87) PCT Pub. No.: WO2012/042900
PCT Pub. Date: Apr. 5, 2012

(65) Prior Publication Data
US 2013/0179021 A1    Jul. 11, 2013

(30) Foreign Application Priority Data
Sep. 30, 2010  (JP) .................................. 2010-221150

(51) Int. Cl.
*B60L 9/00*  (2006.01)
(52) U.S. Cl.
USPC .......................... 701/22; 307/132 A; 307/10.1
(58) Field of Classification Search
USPC ........ 701/22, 31.5; 180/65.1, 65.29; 320/107, 320/109, 137; 455/7, 269, 274; 340/500, 340/635, 644, 638, 652, 654, 12.31, 12.32; 307/9.1, 10.1, 1, 2, 11, 104, 126, 132 E, 307/132 EA, 116, 117, 139
See application file for complete search history.

(56) References Cited

U.S. PATENT DOCUMENTS

| 4,686,382 A | 8/1987 | Shuey | |
| 7,443,049 B1 * | 10/2008 | Jones et al. | 307/9.1 |

(Continued)

FOREIGN PATENT DOCUMENTS

| CN | 101194406 A | 6/2008 |
| CN | 101395027 A | 3/2009 |

(Continued)

OTHER PUBLICATIONS

Extended European Search Report for application No. 11828466.0-1855/2624468 dated Sep. 18, 2013.

(Continued)

*Primary Examiner* — Mary Cheung
*Assistant Examiner* — Rodney Butler
(74) *Attorney, Agent, or Firm* — Pearne & Gordon LLP (57) ABSTRACT

A power line communication system in which a home's power line communication unit can communicate with a vehicle even when a relay is broken off without using a special relay. In this system, a vehicle's PLC communication unit (21) mounted in a vehicle (2) and a home's PLC communication unit (42) installed in a home communicate via a power transmission unit (3) that transmits communication signals and power to be supplied to the vehicle (2). The power transmission unit (3) includes a mechanical relay for conducting or shutting off power to the vehicle (2). The home's PLC communication unit (42) transmits a communication request signal for starting communication to the power transmission unit (3). When the vehicle's PLC communication unit (21) receives the communication request signal transmitted by the home's PLC communication unit (42), the vehicle's PLC communication unit (21) energizes the mechanical relay and then starts communication.

8 Claims, 6 Drawing Sheets

(56) References Cited

U.S. PATENT DOCUMENTS

| | | | |
|---|---|---|---|
| 7,759,817 B2 | 7/2010 | Soma et al. | |
| 2004/0207263 A1* | 10/2004 | Yanagida et al. | 307/10.1 |
| 2009/0079389 A1* | 3/2009 | Ohtomo | 320/109 |
| 2009/0306841 A1* | 12/2009 | Miwa et al. | 701/22 |
| 2011/0022222 A1 | 1/2011 | Tonegawa | |
| 2012/0119701 A1* | 5/2012 | Igata | 320/109 |
| 2012/0193983 A1* | 8/2012 | Yukizane et al. | 307/9.1 |

FOREIGN PATENT DOCUMENTS

| | | |
|---|---|---|
| CN | 101909927 A | 12/2010 |
| JP | 62-043924 A | 2/1987 |
| JP | 2009-171642 A | 7/2009 |
| JP | 2009-171700 A | 7/2009 |
| JP | 2010-110051 A | 5/2010 |
| JP | 2011-015530 A | 1/2011 |
| JP | 2011-120359 A | 6/2011 |
| WO | 2006/132052 A2 | 12/2006 |
| WO | 2010/049773 A2 | 5/2010 |
| WO | 2010/049775 A2 | 5/2010 |

OTHER PUBLICATIONS

International Search Report for Application No. PCT/JP2011/005540 dated Nov. 8, 2011.

Search Report for Chinese Patent Application No. 201180046515.X dated Apr. 17, 2014.

* cited by examiner

POWER LINE COMMUNICATION SYSTEM AND VEHICLE

TECHNICAL FIELD

The present invention relates to a power line communication system in which a vehicle-side power line communication section and a home-side power line communication section communicate with each other.

BACKGROUND ART

In recent years, attention is being focused on the development of electric cars or hybrid cars that use a commercial power supply for a household or the like to charge a secondary battery mounted on the vehicles. This charging is performed using a charging cable. Attention is also being focused on use of this charging cable also for communication (power line communication system) between the home side and the vehicle side in addition to the use for charging.

There is a conventional power line communication system that transmits charging information regarding vehicle-mounted secondary battery from the vehicle to a home-side power line communication section via a charging cable. Furthermore, the conventional power line communication system is provided with a relay that shuts off power in the charging cable (e.g., Patent Literature 1).

There is also another conventional power line communication system that provides a bypass for a relay so that power line communication is made possible even when the relay provided in the power line is shut off (e.g., Patent Literature 2).

CITATION LIST

Patent Literature

PTL 1
Japanese Patent Application Laid-Open No. 2010-110051
PTL 2
Japanese Patent Application Laid-Open No. 62-43924

SUMMARY OF INVENTION

Technical Problem

Since the conventional power line communication system is provided with a relay in the charging cable as described in Patent Literature 1, when this relay is shut off (relay is OFF), the home-side power line communication section cannot communicate with the vehicle. In this case, the relay provided with a bypass in Patent Literature 2 may be used, but there is a problem that it is necessary to use a special relay provided with such a bypass.

The present invention has been implemented to solve such conventional problems, and it is an object of the present invention to provide a power line communication system that allows a home-side power line communication section to communicate with a vehicle even when a relay is shut off, without using any special relay.

Solution to Problem

The present invention is a power line communication system in which a vehicle-side power line communication section mounted on a vehicle side communicates with a home-side power line communication section installed in a home via a power transmission section that transmits a communication signal and power to be supplied to the vehicle, in which the power transmission section includes a mechanical relay for conducting or shutting off power to be supplied to the vehicle, the home-side power line communication section transmits a communication request signal for starting communication to the power transmission section, and the vehicle-side power line communication section energizes, upon receiving the communication request signal transmitted by the home-side power line communication section, the mechanical relay and then starts communication.

Advantageous Effects of Invention

According to the present invention, since the home-side power line communication section transmits a communication request signal for starting communication to the power transmission section even when the mechanical relay is shut off, thus providing an effect that the home-side power line communication section can communicate with the vehicle-side power line communication section even when the mechanical relay is shut off.

DESCRIPTION OF EMBODIMENTS

Figure 1:
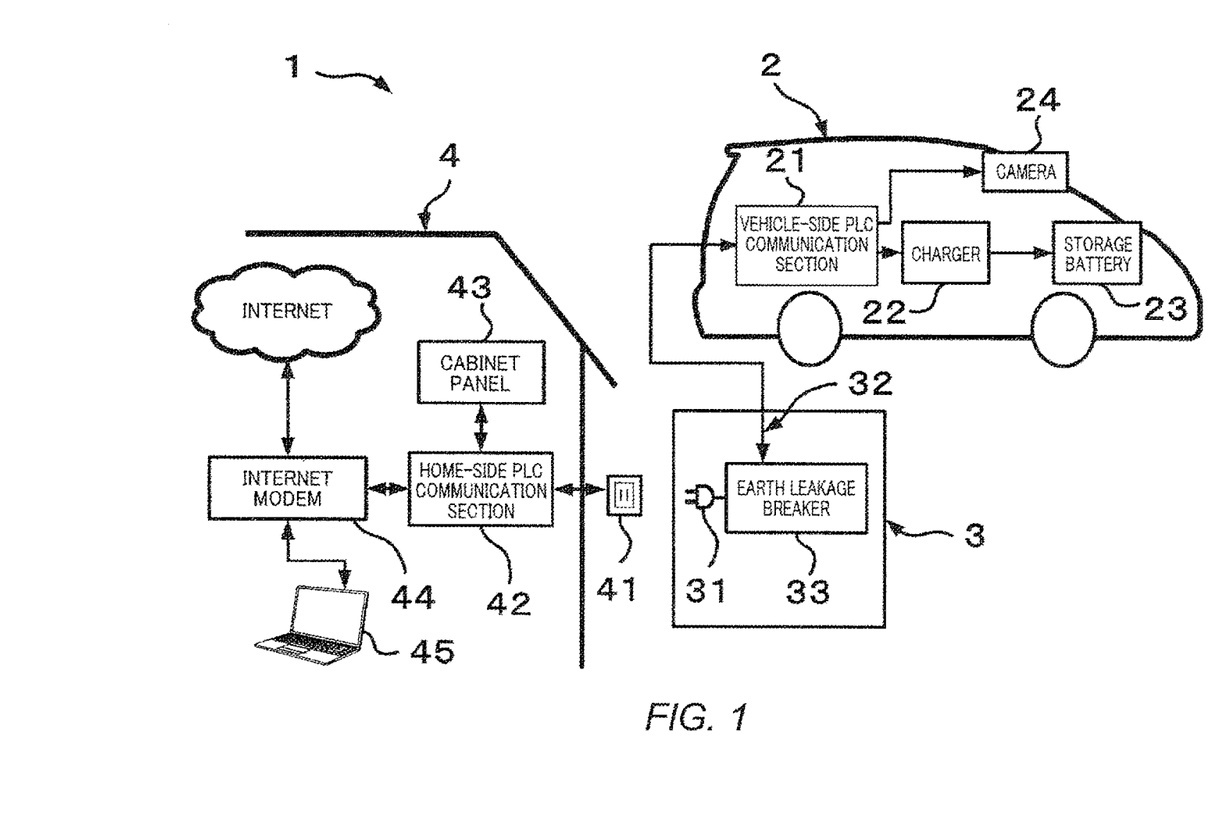
FIG. 1 is a block diagram of a power line communication system according to an embodiment of the present invention.
Figure 2:
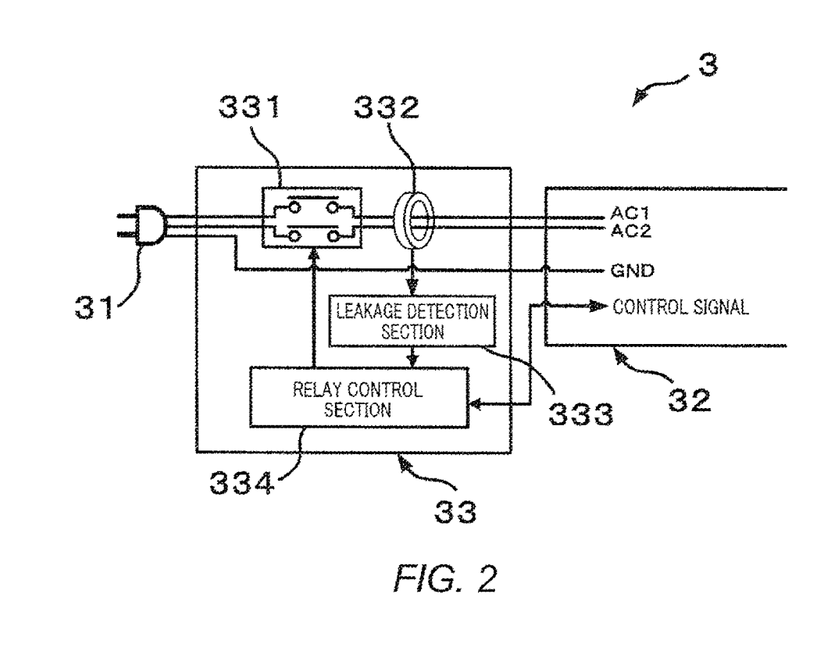
FIG. 2 is a block diagram of a power transmission section according to the embodiment of the present invention.
Figure 3:
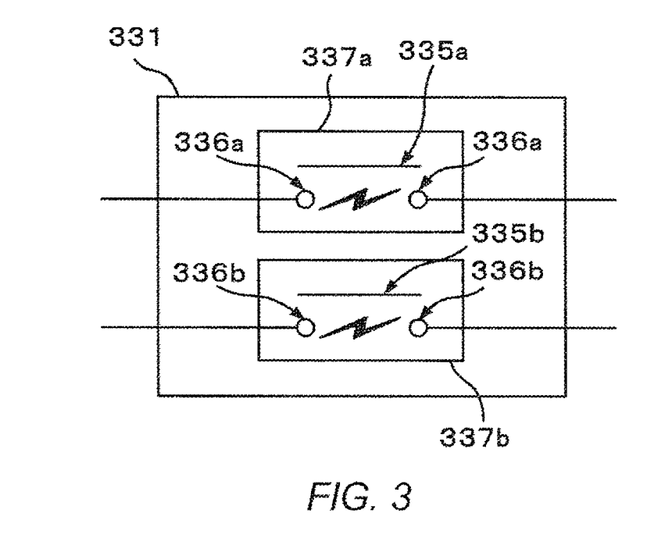
FIG. 3 is a diagram illustrating a structure of a mechanical relay according to the embodiment of the present invention.

Hereinafter, a power line communication system according to an embodiment of the present invention will be described with reference to FIG. 1 to FIG. 3. FIG. 1 is a block diagram of the power line communication system according to the embodiment of the present invention and FIG. 2 is a block diagram of a power transmission section. Furthermore, FIG. 3 is a diagram illustrating a structure of a relay.

Power line communication system 1 shown in FIG. 1 is a system in which vehicle 2 is connected to house 4 via power transmission section 3 to thereby supply power from house 4 (home side) to vehicle 2 (vehicle side). Hereinafter, configurations of vehicle 2, power transmission section 3 and house 4 will be described in detail.

Vehicle 2 is provided with vehicle-side PLC (Power Line Communication) communication section 21 that receives power supplied from house 4 via power transmission section 3, charger 22, storage battery 23 that receives power supplied from charger 22 and camera 24.

Vehicle-side PLC communication section 2 plays a role of superimposing a signal for data communication (hereinafter, referred to as "data communication signal") on power supplied from power transmission section 3 (hereinafter, referred to as "power line" and also separating a data communication signal arriving superimposed on the power line. Vehicle-side PLC communication section 21 can control transmission power when transmitting the data communication signal.

Vehicle-side PLC communication section 21 performs data communication, for example, with camera 24. Vehicle-side PLC communication section 21 controls camera 24, transmits an image acquired by camera 24 to house 4, and can also cause personal computer 45 to display the image. Vehicle-side PLC communication section 21 can communicate with not only camera 24 but also a car air-conditioner, car navigation apparatus, car audio or the like.

In addition, vehicle-side PLC communication section 21 outputs the power supplied from power transmission section. 3 to charger 22. Charger 22 converts the supply power and charges storage battery 23. A secondary battery with a high energy density (e.g., nickel hydrogen battery charger or lithium ion battery charger) can be used for storage battery 23. The power stored in storage battery 23 becomes a drive source to drive tires of vehicle 2 and is used to operate an electric motor. In addition, vehicle-side PLC communication section 21 receives information on mechanical relay 331 (see FIG. 2) provided for power transmission section 3, which will be described later, and also controls this mechanical relay 331.

Power transmission section 3 relays the power supplied from house 4 to vehicle 2. Power transmission section 3 is constructed of plug 31, power cable 32 and earth leakage breaker 33. Power transmission section 3 is provided with functions of not only relaying power but also detecting leakage and shutting off power. FIG. 1 describes power transmission section 3 as if located outside between house 4 and vehicle 2, but power transmission section 3 can be part of the apparatus that constitutes house 4.

A detailed structure of power transmission section 3 will be described using FIG. 2.

When inserted into electrical outlet 41, plug 31 receives power supplied from house 4. Plug 31 may be a plug for an electrical outlet used in a general household or dedicated plug.

Power received by plug 31 is transmitted to power cable 32 via earth leakage breaker 33 and inputted to vehicle-side PLC communication section 21 of vehicle 2. Power cable 32 and vehicle 2 are connected together via a dedicated connector (not shown).

Earth leakage breaker 33 is constructed of mechanical relay 331, coil 332, leakage detection section 333 and relay control section 334.

Mechanical relay 331 outputs the inputted power received by plug 31 to power cable 32. When mechanical relay 331 is energized (ON), the power is supplied to power cable 32, whereas when mechanical relay 331 is shut off (OFF), the power supply is shut off. ON/OFF of mechanical relay 331 is controlled by relay control section 334 or vehicle-side PLC communication section 21.

ON/OFF of mechanical relay 331 may be controlled not only by relay control section 334 or vehicle-side PLC communication section 21 but also by other control sections provided for vehicle 2, for example, charger 22.

When leakage occurs in the power line, a magnetic field of coil 332 changes. Leakage detection section 333 detects this change of the magnetic field. When leakage detection section 333 detects the leakage, relay control section 334 shuts off mechanical relay 331 and transmits information indicating the shut-off to vehicle-side PLC communication section 21 as a control signal.

Although a coil is used for leakage detection. In FIG. 1, not only a coil but any other type of sensor may be used as long as it can detect leakage.

Furthermore, relay control section 334 can also shut off mechanical relay 331 at an instruction of a control signal transmitted from vehicle-side PLC communication section 21. For example, when storage battery 23 is fully charged, charger 22 decides the full charging to prevent overcharging, and transmits a signal including the information, and vehicle-side PLC communication section 21 that has received this signal transmits a control signal to shut off mechanical relay 331. Charger 22 can also decide the full charging and transmit a control signal to shut off mechanical relay 331.

Shut-off of relay control section 334 is performed as shut-off due to leakage or to secure security such as preventing electric shock by contact with the plug and preventing overcharging of storage battery 23 or the like.

Thus, once relay control section 334 is shut off, it can no longer be energized from the home side (house 4 side). This is because a general electrical outlet used in a household is assumed to be used for electrical outlet 41 in house 4 and this general electrical outlet does not have the function of transmitting a control signal for controlling the relay.

Next, the structure of mechanical relay 331 will be described in detail using FIG. 3. Mechanical relay 331 has two sets of movable contact and fixed contact for conducting/shutting off AC power (AC1 and AC2). The number of sets of movable contact and fixed contact of mechanical relay 331 is determined depending on the number of power supplies used, and is not limited to two.

Mechanical relay 331 is not a non-contract relay such as a semiconductor relay, but a relay having a metallic contact. As shown in FIG. 3, mechanical relay 331 is provided with movable contacts 335 (335*a*, 335*b*) and fixed contacts 336 (336*a*, 336*b*).

When energizing mechanical relay 331, movable contacts 335 move toward fixed contacts 336 by a magnetic force of an electromagnet (not shown) causing fixed contacts 336 to come into conduction. On the other hand, when shutting off mechanical relay 331, movable contacts 335 move in the opposite direction of fixed contacts 336 to disconnect fixed contacts 336.

A medium for electromagnetic wave such as air exists between fixed contacts 336 (between fixed contacts 336*a* in FIG. 3) of mechanical relay 331. Even when mechanical relay 331 is shut off, if the transmission power is set to a certain degree of magnitude, fixed contacts 336 function as antennas and electromagnetic wave propagates between fixed contacts 336. In the present embodiment, even when mechanical relay 331 is shut off, the vehicle-side communicates with the home-side.

Mechanical relay 331 can be provided with a radiation preventing cases 337 (337*a*, 337*b*) surrounding movable contacts 335 and fixed contacts 336. Radiation preventing cases 337 can shut off unnecessary radiation generated as a result of fixed contacts 336 functioning as antennas. Particularly, the present invention may perform communication with fixed contacts 336 disconnected from each other and increase transmission power, and is therefore likely to produce unnecessary radiation. For this reason, provision of radiation preventing cases 337 provides a significant effect of reducing noise for peripheral devices.

House 4 is provided with electrical outlet 41 into which plug 31 of power transmission section 3 is inserted to supply power and home-side PLC communication section 42 electrically connected to electrical outlet 41 (corresponding to the home-side power line communication section).

Here, house 4 is not limited to a general house, but may be any collective housing such as condominium, shop like convenience store, gas station or the like or dedicated charging stand as long as it allows electrical outlet 41 to be set up.

Electrical outlet 41 transmits power supplied from cabinet panel 43 to plug 31. Electrical outlet 41 may be an electrical outlet used at a general household or a dedicated connector.

Home-side PLC communication section 42 is disposed between electrical outlet 41 and cabinet panel 43. Home-side PLC communication section 42 plays a role of superimposing a data communication signal on a power line supplied from cabinet panel 43 to electrical outlet 41 and separating a data communication signal arriving superimposed on the power line. Home-side PLC communication section 42 can control transmission power when transmitting the data communication signal.

This data communication signal is used for communication with personal computer 45 via Internet modem 44. Home-side PLC communication section 42 is also connected to the Internet via Internet modern 44, and can transmit/receive information to/from a server on the Internet through the data communication signal. Personal computer 45 can also be directly connected to home-side PLC communication section 42 without going through Internet modem 44.

Figure 4:
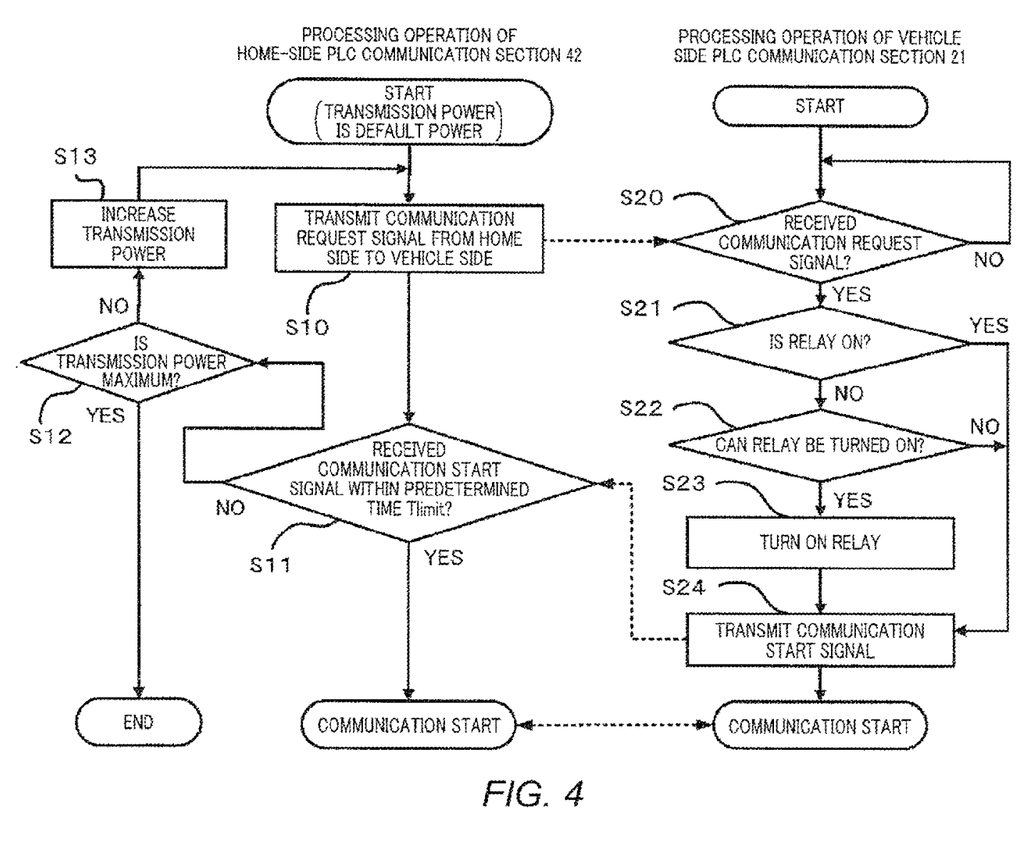
FIG. 4 is a diagram illustrating operation of the power line communication system according to the embodiment of the present invention.
Figure 5:
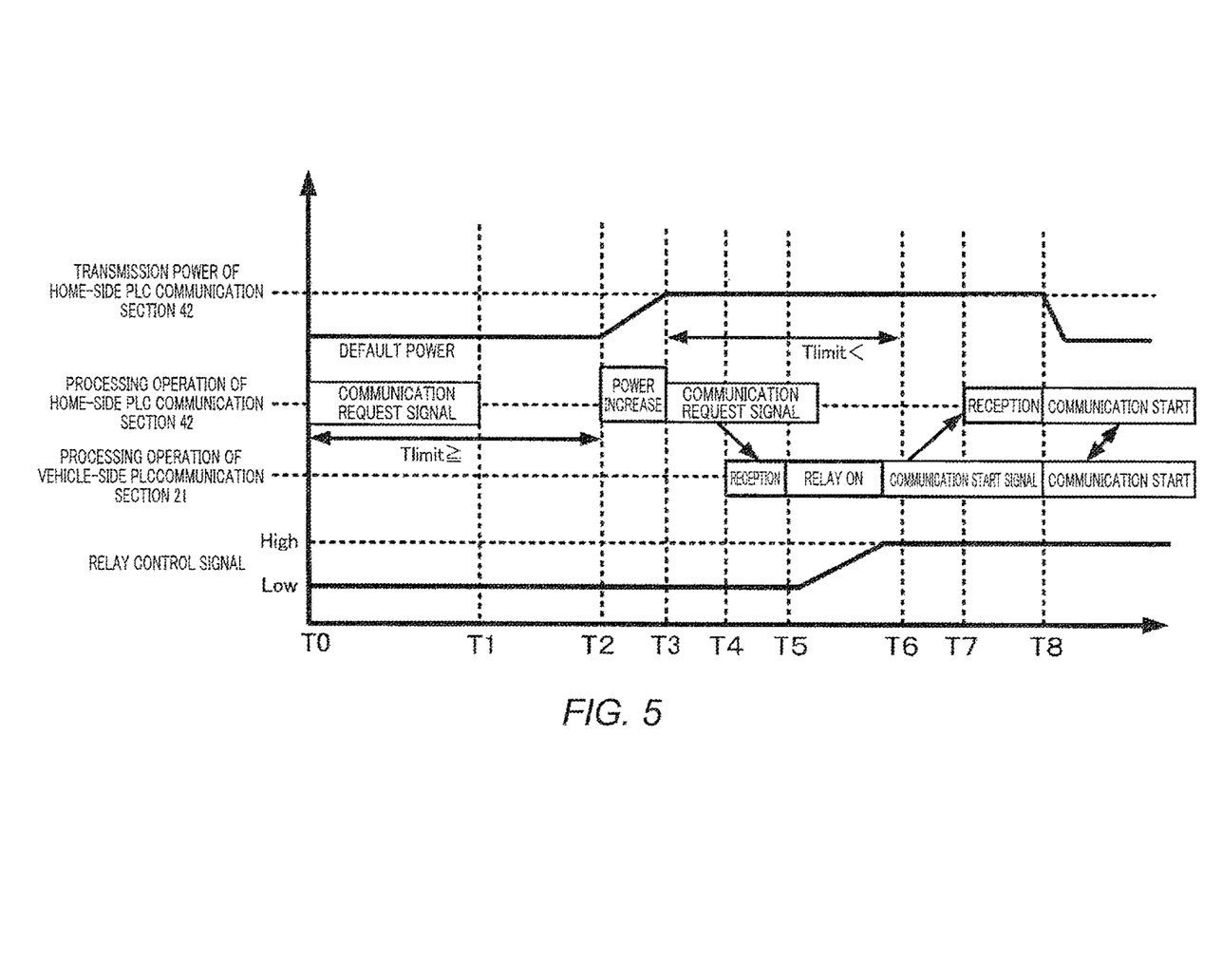
FIG. 5 is a timing chart of the power line communication system according to the embodiment of the present invention.

Next, processing operation until communication starts will be described using FIG. 4 and FIG. 5. FIG. 4 is a diagram illustrating operation of the power line communication system according to the embodiment of the present invention. The flowchart on the left side of FIG. 4 shows operation of home-side PLC communication section 42 and the flowchart on the right side of FIG. 4 shows operation of vehicle-side PLC communication section 21. Furthermore, FIG. 5 is a timing chart of the power supply system.

Home-side PLC communication section 42 transmits a communication request signal to start communication to power transmission section 3 when mechanical relay 331 is shut off. Vehicle-side PLC communication section 21 starts communication when it receives the communication request signal transmitted by home-side PLC communication section 42. Hereinafter, detailed description will be given.

After starting the processing, home-side PLC communication section 42 transmits a communication request signal to vehicle-side PLC communication section 21 (S10). The communication request signal is a signal for establishing communication with vehicle-side PLC communication section 21. After receiving the communication request signal, vehicle-side PLC communication section 21 transmits a communication start signal. At the start of the processing, home-side PLC communication section 42 transmits the communication start signal with specified transmission power (hereinafter, referred to as "default power"). This default power is, for example, a value on the order of −65 dBm/Hz.

After starting the processing, vehicle-side PLC communication section 21 decides whether the communication request signal has been received or not (S20). When the communication request signal has not been received (NO in S20), vehicle-side PLC communication section 21 executes 520 again.

Upon receiving the communication request signal (YES in S20), vehicle-side PLC communication section 21 decides whether mechanical relay 331 is energized or not (S21). When mechanical relay 331 is energized (YES in S21), vehicle-side PLC communication section 21 proceeds the process to S24.

When mechanical relay 331 is not energized (shut off) (NO in S21), vehicle-side PLC communication section 21 decides whether it is possible to energize mechanical relay 331 or not (S22). When leakage detection section 333 has detected leakage and mechanical relay 331 has been shut off, mechanical relay 331 cannot be energized (NO in S22). In addition, when supplying power to the vehicle-side may cause leakage, for example, when a relay (not shown) provided between charger 22 and storage battery 23 is melted and cannot be shut off or when charger 22 detects an error, mechanical relay 331 cannot be energized. At this time, vehicle-side PLC communication section 21 proceeds the process to S24 and starts communication while keeping mechanical relay 331 shut off.

When mechanical relay 331 is kept shut off, communication with home-side PLC communication section 42 is possible although the communication speed is limited. This makes it possible to prevent communication from being interrupted for the reason that mechanical relay 331 cannot be energized.

When mechanical relay 331 can be energized (YES in S22), vehicle-side PLC communication section 21 energizes mechanical relay 331, then proceeds the process to S24 and starts communication.

Thus, upon receiving a communication request signal transmitted from home-side PLC communication section 42, vehicle-side PLC communication section 21 energizes mechanical relay 331 and then starts communication. Thus, even when mechanical relay 331 is shut off, it is possible to energize mechanical relay 331 from home-side PLC communication section 42, secure a communication channel and start communication without the need for having any special communication path.

Upon starting communication in S24, vehicle-side PLC communication section 21 transmits a communication start signal to power transmission section 3. After transmitting the communication request signal (S10), if this communication start signal is received within a predetermined time Tlimit, home-side PLC communication section 42 decides that communication has been established (YES in S11).

In S24, mechanical relay 331 may be energized, but vehicle-side PLC communication section 21 transmits a communication start signal with a degree of power that allows the fixed contacts of mechanical relay 331 to communicate with each other through radiation of electromagnetic wave.

When the communication start signal cannot be received within the predetermined time Tlimit (NO in S11), home-side PLC communication section 42 proceeds the process to S12 assuming that communication has not been successfully established. Here, the predetermined time Tlimit is a value on the order of several seconds.

When the communication start signal cannot be received within the predetermined time Tlimit (NO in S11) and if the transmission power is not a maximum (NO in S12), home-side PLC communication section 42 increase the transmission power (S13) and retransmits the communication request signal (S10).

The reason that the communication start signal cannot be received may be attributable to the fact that the radiation of electromagnetic wave was not strong enough to allow fixed contacts 336 of shut-off mechanical relay 331 to communicate with each other. Therefore, increasing the transmission power allows the communication request signal to reach vehicle-side PLC communication section 21.

However, increasing the transmission power unlimitedly may cause fixed contacts 336 of mechanical relay 331 to function as antennas, producing unnecessary radiation and generating noise which is not desirable for peripheral devices. Thus, it is necessary to set a maximum value of the transmission power.

When this maximum value is exceeded (YES in S12), home-side PLC communication section 42 ends the process without retransmitting the communication request signal.

This maximum value of the transmission power is a value on the order of −55 dBm/Hz, for example.

When communication is started ("communication start" in FIG. 4), vehicle-side PLC communication section 21 and home-side PLC communication section 42 execute process after starting communication, which will be described later.

Next, the temporal progress of the processing operation in FIG. 4 will be described using FIG. 5. T0 in FIG. 5 is the start of FIG. 4. The transmission power of home-side PLC communication section 42 is default power. At T0, home-side PLC communication section 42 transmits a communication request signal and waits for a communication start signal to be returned (S11). At T2, when the communication start signal cannot be received within the predetermined time Tlimit (NO in S11), home-side PLC communication section 42 increases the transmission power (S13) and retransmits the communication request signal at T3 (S10).

When vehicle-side PLC communication section 21 receives the communication request signal at 14 (S20), since the relay control signal is low at 15, mechanical relay 331 is shut off (NO in S21), vehicle-side PLC communication section 21 energizes mechanical relay 331 (drives the relay control signal High) to secure a communication channel.

Next, at 16, vehicle-side PLC communication section 21 transmits a communication start signal to home-side PLC communication section 42 (S24). Upon receiving the communication start signal within the predetermined time Tlimit (YES in S11) at T7, home-side PLC communication section 42 starts communication at 18.

Figure 6:
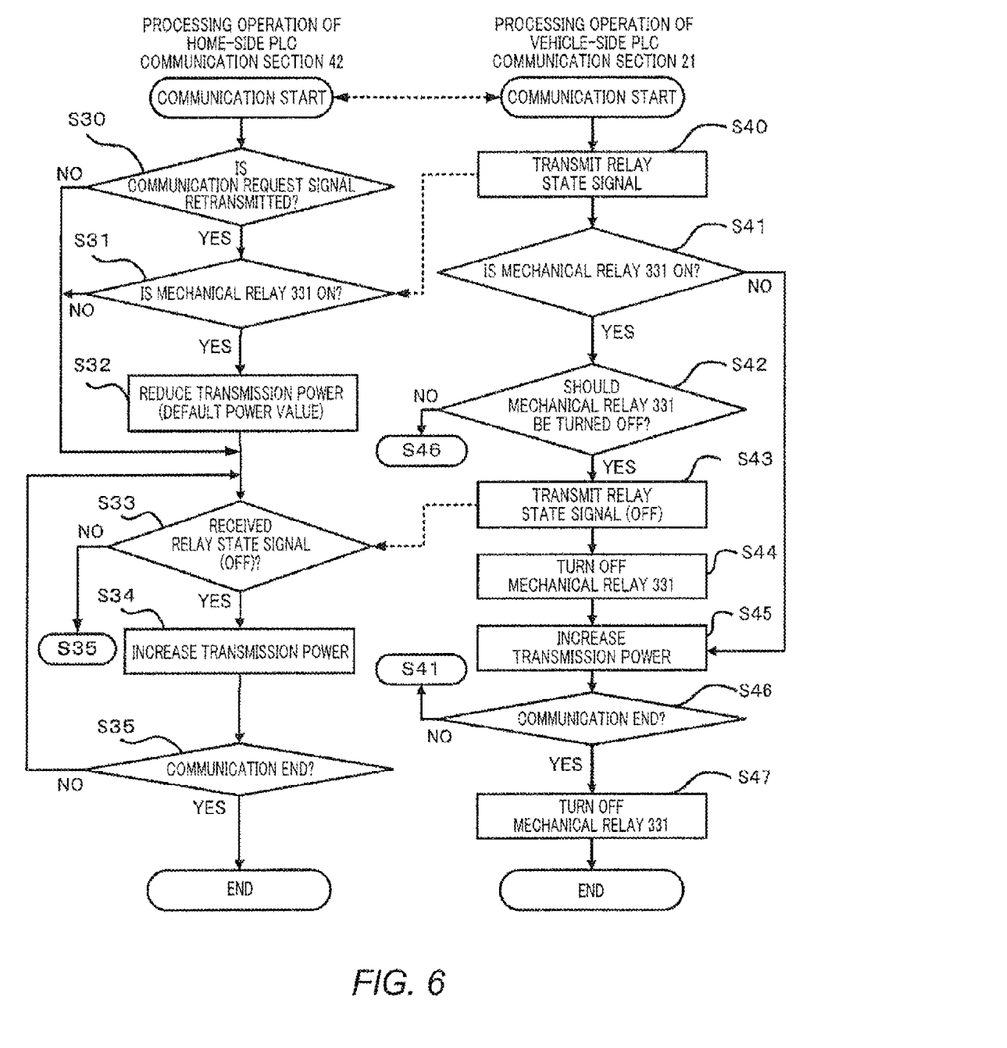
FIG. 6 is a diagram illustrating operation of the power line communication system according to the embodiment of the present invention.

Next, the processing operation from the start to the end of communication will be described using FIG. 6. FIG. 6 is a diagram illustrating operation of the power supply system according to the embodiment of the present invention.

After starting communication, vehicle-side PLC communication section 21 transmits a state of mechanical relay 331 (energized or shut off) to home-side. PLC communication section 42 as a relay state signal.

Home-side PLC communication section 42 retransmits a communication request signal in S13 and S10 (YES in S30), and when the received relay state signal indicates that mechanical relay 331 is energized (YES in S31), home-side PLC communication section 42 reduces the transmission power when transmitting information to be transmitted to vehicle-side PLC communication section 21 down to default power (S32). The time period from T8 in FIG. 5 onward corresponds to this time.

The communication request signal is retransmitted when mechanical relay 331 is shut off with increased transmission power so as to enable fixed contacts 336 to communicate with each other through radiation. However, after starting communication, performing communication by increasing transmission power until mechanical relay 331 is energized causes unnecessary radiation to be generated. Thus, performing the process of reducing transmission power as described above has an effect that unnecessary radiation can be reduced.

When the communication request signal is not transmitted (NO in S30) or when the received relay state signal indicates the shut-off of mechanical relay 331 (NO in S31), home-side PLC communication section 42 proceeds the process to S33.

After S40, vehicle-side PLC communication section 21 decides whether mechanical relay 331 has been energized or not (S41), and decides, when mechanical relay 331 has been energized (YES in S41), whether mechanical relay 331 needs to be shut off or not (S42).

The case in S42 where mechanical relay 331 needs to be shut off is, for example, a case where storage battery 23 has reached a target amount of charge. In this case, to prevent overcharging of storage battery 23, mechanical relay 331 is shut off so as to stop power supply from house 4.

Furthermore, the case in S42 where the shut-off of mechanical relay 331 is necessary is, for example, a case of shut-off due to leakage. When leakage detection section 333 detects leakage and shuts off mechanical relay 331, relay control section 334 transmits, beforehand, a control signal for indicating that the relay will be shut off. Thus, home-side PLC communication section 42 can obtain a signal indicating that mechanical relay 331 will be shut off.

When mechanical relay 331 needs to be shut off (YES in S42), vehicle-side PLC communication section 21 transmits a relay state signal (shut-off) containing information indicating that mechanical relay 331 is shut off to home-side PLC communication section 42 (S43) and then shuts off mechanical relay 331 (S44).

Upon receiving (YES in S33) the relay state signal (shut-off) transmitted in S43, home-side PLC communication section 42 increases transmission power (S34). This relay state signal contains information indicating that mechanical relay 331 is shut off. By so doing, transmission power is increased even when mechanical relay 331 is shut off, and fixed contacts 336 can thereby communicate with each other through radiation, providing an effect that communication can be continued.

After transmitting the relay state signal in S43, vehicle-side PLC communication section 21 shuts off mechanical relay 331 (S44). This is intended to avoid such a case that when home-side PLC communication section 42 shuts off mechanical relay 331 before increasing the transmission power (S34), home-side PLC communication section 42 may not be able to continue communication.

However, mechanical relay 331 may also be shut off when leakage detection section 333 detects leakage. In this case, vehicle-side PLC communication section 21 may not be able to continue communication. At this time, vehicle-side PLC communication section 21 and home-side PLC communication section 42 resume the process from the start in FIG. 4.

When the relay state signal (shut-off) has not been received (NO in S33), home-side PLC communication section. 42 proceeds the process to S35.

When mechanical relay 331 is shut off in S41 (NO in S41) or after shutting off mechanical relay 331 in S44, vehicle-side PLC communication section 21 increases the transmission power compared to that before shutting off mechanical relay 331 and continues communication (S45). This is for the same reason as in S34.

When increasing the transmission power in S45, vehicle-side PLC communication section 21 may also receive the value of the transmission power set by home-side PLC communication section 42 in S34 and set this value. When home-side PLC communication section 42 has already completed the setting of power with which communication is possible, such direct reception allows appropriate transmission power to be set at an early stage.

When the shut-off of mechanical relay 331 is unnecessary in S42 or after the processing end in S45, vehicle-side PLC communication section 21 decides whether or not to end communication (S46).

Here, the communication end refers to a case where vehicle-side PLC communication section 21 and home-side PLC communication section 42 have completed communication, for example, a case where home-side PLC communication section 42 has completed the reception of the information (charging state, temperature in the vehicle or the like) that vehicle-side PLC communication section 21 requested from the vehicle-side.

When ending communication (YES in S46), vehicle-side PLC communication section 21 shuts off mechanical relay 331 (S47) and ends the process. When not ending communication (NO in S46), vehicle-side PLC communication section 21 returns the process to S41.

Shutting off mechanical relay 331 after the communication end provides an effect that it is possible to prevent lightening surge generated in house 4 or power transmission section 3 from propagating to vehicle 2, causing damage to apparatuses in the vehicle.

Furthermore, when the power cable is damaged and the conductor is exposed, if a current flows from the home side, there may be a danger of electric shock or the like. Shutting off mechanical relay 331 after the communication end provides an effect of enhancing safety even in such a case.

Furthermore, after the processing end in S34, home-side PLC communication section 42 decides whether or not to end the communication (S35) and ends the communication when it decides to end the communication (YES in S35). When it decides not to end the communication (NO in S35), the process is returned to S33.

After the process in FIG. 6 ends, vehicle-side PLC communication section 21 and home-side PLC communication section 42 return the process to the start in FIG. 4 again.

Vehicle-side PLC communication section 21 may also energize mechanical relay 331 only when the received communication request signal includes a predetermined pattern. The pattern included in the communication request signal may be a combination of "0"s and "1"s and preferably differs from one vehicle to another. This pattern can be determined beforehand between vehicle-side PLC communication section 21 and home-side PLC communication section 42 using a method whereby vehicle-side PLC communication section 21 transmits a number specific thereto to home-side PLC communication section 42 at the last energizing of mechanical relay 331 or a method whereby vehicle-side PLC communication section 21 and home-side PLC communication section 42 use random numbers or the like.

By energizing mechanical relay 331 only when the received communication request signal includes a predetermined pattern, it is possible to prevent vehicle PLC communication section 21 that has happened to receive a radio signal not transmitted from home-side PLC communication section 42 from energizing mechanical relay 331. Since vehicle PLC communication section 21 is susceptible to influences of radio wave from a radio or radio communication or the like, this method is effective in removing such influences.

The present embodiment has described the communication between the vehicle side and the home side as PLC, but the present invention is not limited to this, and this PLC needs only to be communication carried out via a power line, and the present invention is applicable to communication of any modulation scheme.

In S24 of FIG. 4, even when vehicle-side PLC communication section 21 transmits a communication start signal, the predetermined time Tlimit may already have elapsed in S11. In this case, vehicle-side PLC communication section 21 cannot start communication with home-side PLC communication section 42. Therefore, in the case where it is not possible to receive a signal transmitted from home-side PLC communication section 42 even when a predetermined timeout time has elapsed after transmitting a communication start signal in S24, vehicle-side PLC communication section 21 may return the process to S20.

The disclosure of Japanese Patent Application No. 2010-221150, filed on Sep. 30, 2010, including the specification, drawings and abstract is incorporated herein by reference in its entirety.

INDUSTRIAL APPLICABILITY

The present invention is suitable for use as a power line communication system in which a vehicle-side power line communication section and a home-side power line communication section perform communication.

REFERENCE SIGNS LIST

1 Power line communication system
2 Vehicle
3 Power transmission section
4 House
21 Vehicle-side PLC communication section
22 Charger
23 Storage battery
24 Camera
31 Plug
32 Power cable
33 Earth leakage breaker
331 Mechanical relay
332 Coil
333 Leakage detection section
334 Relay control section
335 Movable contact
336 Fixed contact
337 Radiation preventing case
41 Electrical outlet
42 Home-side PLC communication section
43 Cabinet panel
44 Internet modem
45 Personal computer

The invention claimed is:

1. A power line communication system in which a vehicle-side power line communication section mounted on a vehicle side communicates with a home-side power line communication section installed in a home via a power transmission section that transmits power to be supplied to the vehicle, wherein:
   the power transmission section comprises a mechanical relay comprising a plurality of fixed contacts for conducting or shutting off power to be supplied to the vehicle,
   the home-side power line communication section transmits a communication request signal for starting communication to the power transmission section, and
   the vehicle-side power line communication section energizes the mechanical relay upon receiving the communication request signal transmitted by the home-side power line communication section using propagation of electromagnetic wave between the fixed contacts of the mechanical relay as a data communication path while the fixed contacts are disconnected, and then starts communication.

2. The power line communication system according to claim 1, wherein:
   the vehicle-side power line communication section transmits a communication start signal to the power transmission section before starting communication, and
   when the communication start signal transmitted by the vehicle-side power line communication section cannot be received by a time at which a predetermined time elapses after transmitting the communication request signal, the home-side power line communication section increases transmission power compared to that of the communication request signal transmitted last time and retransmits the communication request signal.

3. The power line communication system according to claim 2, wherein upon retransmitting the communication request signal, the home-side power line communication section communicates with the vehicle-side power line communication section with smaller power than transmission power at the time of retransmission of the communication request signal when starting communication with the vehicle-side power line communication section.

4. The power line communication system according to claim 1, wherein the vehicle-side power line communication section shuts off the mechanical relay after communication with the home-side power line communication section ends.

5. The power line communication system according to claim 1, wherein:
the power transmission section further comprises a leakage detection section that detects leakage,
the vehicle-side power line communication section shuts off the mechanical relay when the leakage detection section detects leakage after starting communication by energizing the mechanical relay, and
the home-side power line communication section increases transmission power compared to that before shutting off the mechanical relay.

6. The power line communication system according to claim 5, wherein after shutting off the mechanical relay, the vehicle-side power line communication section performs communication with increased transmission power compared to that before shutting off the mechanical relay.

7. The power line communication system according to claim 5, wherein after shutting off the mechanical relay, the vehicle-side power line communication section receives a value of the transmission power of the home-side power line communication section from the home-side power line communication section and performs communication with the same transmission power as the value.

8. A vehicle that communicates with a home-side power line communication section installed in a house via a transmission section comprising a plurality of fixed contacts and a mechanical relay for conducting or shutting off power to be supplied to the vehicle, the vehicle comprising:
a vehicle-side power line communication section that starts communication after energizing the mechanical relay when receiving a communication request signal transmitted by the home-side power line communication section using propagation of electromagnetic wave between the fixed contacts of the mechanical relay as a data communication path while the fixed contacts are disconnected.

* * * * *